3,476,818
METHOD OF PREPARING CYCLOHEXANE FROM TOLUENE
Dorrance P. Bunn, Jr., Edward F. Janes, and Dale Williams, Houston, Tex., assignors to Texaco Inc., New York, N.Y., a corporation of Delaware
Filed July 17, 1967, Ser. No. 653,952
Int. Cl. C07c 5/10
U.S. Cl. 260—667                                             6 Claims

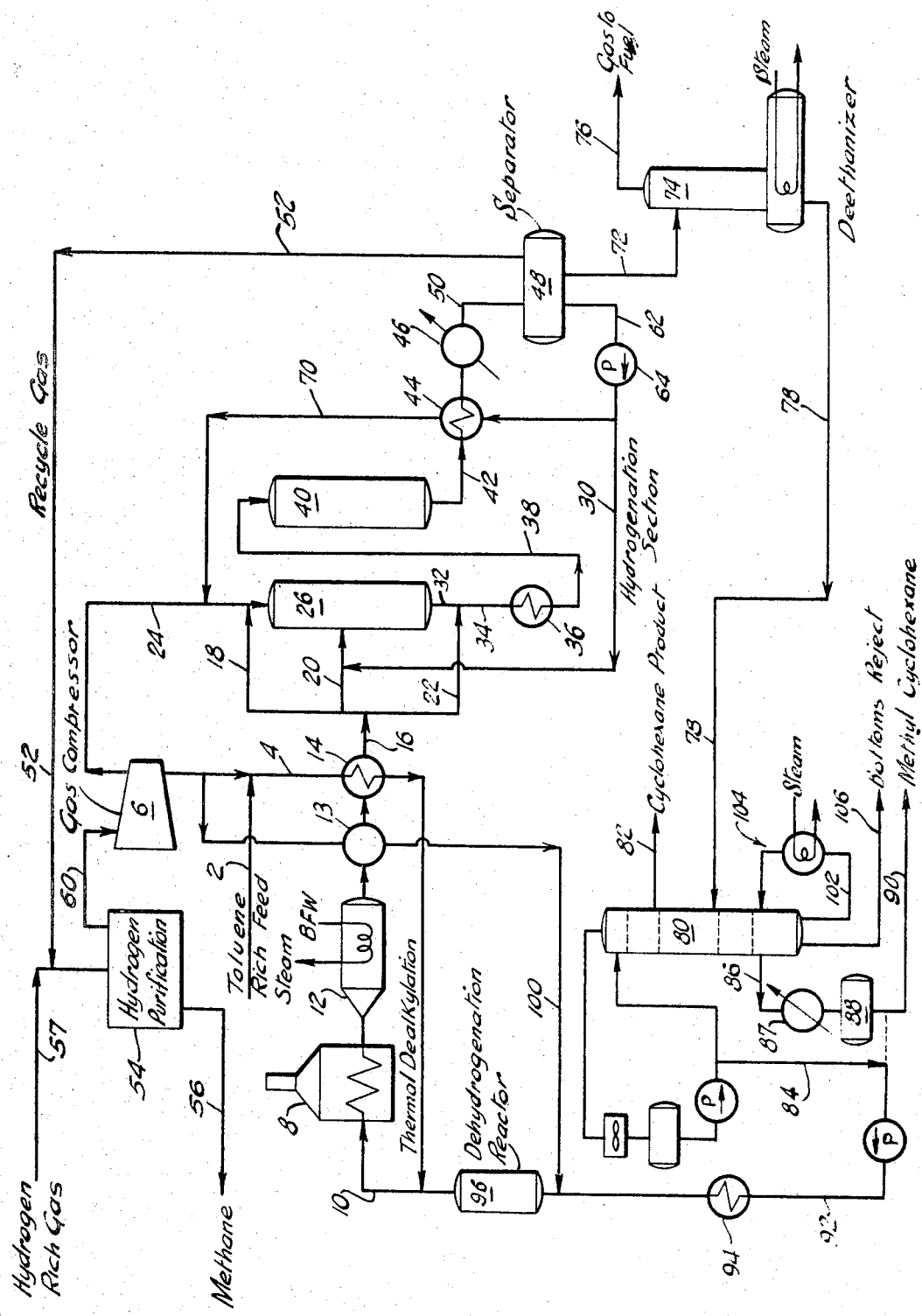

ABSTRACT OF THE DISCLOSURE

This invention and this disclosure are directed to a method of producing cyclohexane from toluene. More specifically, this invention and this disclosure are directed to a method of preparing cyclohexane from a toluene rich feed by first preparing benzene by a dealkylation procedure and thence hydrogenating the dealkylation effluent employing a suitable hydrogenation catalyst. A particular feature of the invention revolves about utilizing a common hydrogen supply or loop for the dealkylation and hydrogenation sections.

BACKGROUND OF THE INVENTION

Field of the invention

This invention resides in the field of invention devoted to the preparation of cyclohexane. More particularly, this invention relates to the field of the invention revolving about the method of preparing cyclohexane from toluene by first preparing an intermediate benzene feed and directly feeding the dealkylation unit effluent into a hydrogenation section. A particular novel feature revolves about preparing a benzene rich stream by dealkylation and charging the benzine rich stream into the hydrogenation section. The process utilizes a common hydrogen supply and a common hydrogen recycle line.

Discussion of the prior art

The art is repleat with disclosures on the method of preparing benzene from toluene. This can be performed in two methods either by thermal hydrodealkylation or by catalytic methods. Other art revolves about the preparation of cyclohexane from a pure benzene stream wherein benzene is charged into a reaction vessel together with hydrogen or to which is admitted hydrogen. The vessel contains a suitable hydrogenation catalyst such as one containing nickel. The preparation of cyclohexane has, heretofore, necessitated the preparation of the benzene first which was distilled or separated to a pure charge stock and thence later fed as a pure stream into the cyclohexane unit. This necessitated increased cost entailed in the separation procedure and thus increased the cost of the cyclohexane. It is therefore desirable to provide a system which operates continuously from a toluene rich feed and results in a good yield of cyclohexane. It is desirable to provide such a process in which the dealkylation unit is integrated with the cyclohexane unit by a common hydrogen supply which can be altered to adjust the desired mol ratios of hydrogen in both the dealkylation unit and the cyclohexane unit. Such a unit decreases the cost entailed as a single hydrogen supply unit can function to supply the hydrogen needed for both opertaions.

SUMMARY OF THE INVENTION

Objects of the invention

It is an object of this invention, therefore, to provide an integrated dealkylation-cyclohexane unit whereby toluene can be converted to cyclohexane.
It is still another object of this invention, therefore, to provide a method for producing cyclohexane from a toluene rich stream employing a single hydrogen supply which functions to supply hydrogen both to a dealkylation unit and to a hydrogenation section.
These and other objects of this invention will become apparent from the following complete description and appended claims.

Statement of the invention

This invention resides in an improvement in a process for preparing cyclohexane from toluene in which toluene is dealkylated to benzene in the presence of hydrogen and the resultant benzene is hydrogenated to cyclohexane. The improvement resides in charging a portion of the total hydrogen to the dealkylation unit and a portion of the hydrogen to the hydrogenation unit and passing the total product effluent from said dealkylation unit to said hydrogenation unit and recovering from the hydrogenation effluent a major amount of the total hydrogen charged to said units and recycling said hydrogen to said units.

The process of this invention can be operated with various modifications. The dealkylation can be either thermal or catalytic although thermal dealkylation is preferred. The process parameters for the dealkylation unit are not critical. Generally, it is preferred to have a mol ratio of hydrogen to toluene charged in the dealkylation unit of at least 5:1 and a reaction temperature of at least 1150° F. prefertbly at least 1375° F. This unit can be equipped with hydrogen quench lines to maintain the temperature of the reaction below about 1450° F. as the dealkylation tends to be highly exothermic. The hydrogenation section is operated at a mol ratio of hydrogen to entering hydrocarbon of between about 5:1 and 15:1, preferably 8:1–13:1 and most preferably 9:1. The hydrogenation section comprises at least one vessel equipped with a suitable hydrogenation catalyst such as a nickel on alumina catalyst or a platinum on alumina catalyst. A suitable nickel on alumina catalyst sold by Harsaw Chemical Company under the designation Ni1404T can be employed. The temperature in the hydrogenation section can be between about 300–500° F. preferably between 400 and 450° F. and the pressure can be between about 300 and 800 p.s.i.g., preferably 500 p.s.i.g.

In order to more fully understand and appreciate the instant invention reference is made to the accompanying drawing which shows the best mode contemplated by us for carrying out the instant invention. A toluene rich feed is fed through line 2 and into line 4 to which is added hydrogen from gas compressor 6. The hydrogen to hydrocarbon mol ratio in line 4 is between 2 and 12 especially between 4 and 6. The toluene rich feed and hydrogen are charged into a thermal dealkylation unit which comprises three cells. Line 10, to which line 4 feeds, passes through the cells as it passes through the heater 8. The temperature in the first cell is sufficient to increase the reaction mixture to a temperature above the reaction threshold, generally at about 1150° F. The reaction mixture then passes into a second cell and heat is applied to the reaction mixture with concomitant cooling employing a hydrogen quench from a hydrogen source not shown. The temperature is maintained below 1450° F. The so heated and quenched reaction mixture passes into the third heated cell where the temperature is maintained below 1450° F. with another hydrogen quench stream being added thereto. The effluent from the dealkylation unit 8 passes through a waste heat boiler 12 through which passes in indirect heat exchange boiler feed water (BFW). The effluent then passes through a heat exchanger 13 and a second heat exchanger 14 heating the feed to the reaction in line 4 and being cooled as a result. The dealkylation unit effluent then in its entirety becomes the feed to the hydrogenation unit. It leaves the heat exchanger in line 16 at 300° F. and under a pressure of about 700–800 p.s.i.g. It then is divided into three lines 18, 20 and 22 each containing one third of the total effluent from the dealkylation unit. The dealkylation effluent in line 18 is fed into line 24 which contains hydrogen under a pressure of about 700 p.s.i.g. emanating from the gas compressor 6. The dealkylation effluent in line 20 enters the hydrogenation section reactor 26 directly. To this reactor is added the hydrogen and dealkylation effluent in line 24. A hydrogenation recycle in line 30 is admixed with the dealkylation unit effluent en route to the hydrogenation unit in line 20 and the mixture is introduced into the reactor 26. The benzene so prepared in the dealkylation unit is hydrogenated in line 26 in the presence of a nickel on alumina catalyst and passes out line 32 with a substantial amount of heat evolved due to the exothermic nature of this hydrogenation reaction. To line 32 is charged the remaining one third of the dealkylation unit effluent in line 22. The reaction product from reactor 26 in line 32 and the dealkylation effluent in line 22 are mixed in line 34 causing cooling of the effluent in line 32. The mixture in line 34 passes through cooler 36 through which passes in indirect heat exchange cold water. In line 38, the hydrogenation unit effluent passes into a second hydrogenation unit 40 which also contains a suitable hydrogenation catalyst such as nickel on alumina. The balance of the benzene is converted under equilibrium conditions to cyclohexane at a temperature of about 350–500° F. and under a pressure of about 500 p.s.i.g. The total effluent is withdrawn in line 42 and passes through heat exchanger 44 and thence through a cooler 46 to a high pressure separator 48 via line 50. The major amount of the total hydrogen charged to the reaction system is separated from this high pressure separator which operates at a pressure of about 500 p.s.i.g. and is withdrawn in line 52 and recycled to hydrogen purification unit 54 from which there is bled methane in line 56, hydrogen rich gas entering via line 57. The purified hydrogen is withdrawn from the hydrogen purification unit 54 in line 60 and enters the gas compressor 6 for feed to the dealkylation unit and hydrogenation unit. A portion of the liquid phase in the high pressure separator is withdrawn in line 62, passes through pump 64 and enters line 30 for admixture with dealkylation unit effluent in line 20 for the purpose of cooling and controlling the reaction in reactor 26. A portion of the product in line 30 is withdrawn and passes through heat exchanger 44 in line 70 and is admixed with hydrogen entering the reactor 26 in line 24. This also serves as a quench in the reactor 26. A major portion of the liquid phase from the high pressure separator 48 is removed in line 72 and enters a deethanizer 74 operating under pressure of about 100 p.s.i.g. From the deethanizer 74 gas is removed overhead in line 76 comprising methane and ethane and a small quantity of hydrogen. The stabilized liquid from deethanizer 74 is withdrawn therefrom in line 78 and passes to cyclohexane product fractionator 80 from which cyclohexane product is removed as a side stream in line 82 at about the fourth tray from the top. This is a pasteurization type tower. Overhead from cyclohexane product fractionator 80 is taken at 20 p.s.i.g. and condensed and refluxed back into the tower with a slip stream being withdrawn to avoid a buildup of low boiling trace impurities in the system. This slip stream is designated 84 and amounts to about one half percent of the total feed to cyclohexane fractionator 80.

Methyl cyclohexane is withdrawn as a vapor side stream in line 86, passes through a condenser 87 and enters an accumulator 88. Optionally, it can be withdrawn in line 90 for packaging or can be recycled together with the methyl cyclopentane and other light impurities from line 84 in line 92 to the thermal dealkylation unit via dehydrogenation reaction 96. In route to the thermal dealkylation unit, the mixture in line 92 passes through a steam heater 94 and enters a dehydrogenation reactor 96 prior to which there is admixed with the mixture in line 92 hydrogen from line 100 which emanates from the line 4 and gas compressor 6. The mol ratio of hydrogen to hydrocarbon in the dehydrogenation reactor 96 is 4:1 but can be in the range of about 2:1 to 6:1. This unit dehydrogenates the methyl cyclohexane to toluene in about 100 percent yield and the so dehydrogenated product is recycled to the dealkylation heater 8 in line 10 for processing in accordance with the above disclosure.

The dehydrogenation reactor is operated at a liquid hourly space velocity of between 5 and 15 preferably at 10:1. It is operated at a temperature of between 850 and 950° F. preferably 880° F. The catalyst is suitably a platinized alumina catalyst such as Englehard RD–150 although other suitable dehydrogenation catalysts can be employed. The pressure in the reactor can vary between about 250–900 p.s.i.g. and is preferably greater than the pressure upon the reactants as they pass through the dealkylation unit.

From the cyclohexane product fractionator 80 there is withdrawn a small stream in line 102 which passes through a reboiler 104 where it is reboiled back into cyclohexane product fractionator 80. A bottoms reject is withdrawn from cyclohexane product fractionator 80 in line 106. This bottoms reject comprises dinucleate naphthenes in amount of about 1 percent by weight of the total feed to the cyclohexane product fractionator 80.

It can be seen from the foregoing that we have provided a significant improvement in the manufacture of cyclohexane from a toluene rich stream which does not necessitate the separation of a benzene fraction from the dealkylation effluent. Thus by this design we can feed the dealkylate directly to the hydrogenation unit. Our process advantageously uses the hydrogen charged to the dealkylation unit in the hydrogenation unit to provide the desired hydrogen to hydrocarbon mol ratio in hydrogenation unit. The conversion of aromatics to naphthenes in the hydrogenation unit is substantially 100 percent. Our design can be performed over a long period of time and utilizes the hydrogen and the products effectively to control the temperature of the hydrogenation reactor in the units 26 and 40. Furthermore, the process design does not require two separate hydrogen supplies or inordinately large amounts of equipment for separation of the desired end product. Cyclohexane product is immediately available for sale or for conversion to adipic acid or other precursors for the preparation of nylon 6 or nylon 66 polymers. Methylcylohexane, in addition to the cyclohexane produced, is immediately available for sale or use as a plasticizer or commercial solvent. Alternatively, the product can be conveniently dehydrogenated and recycled to the thermal dealkylation unit for conversion to benzene and thence to cyclohexane. This enables substantially 100 percent conversion of torque to cyclohexane in a minimum of steps. It will also be realized that the design can be employed with a minimum of cost maximizing the abilities of the various ingredients passing through the process lines. It wil be realized that while we prefer to employ a thermal dealkylation unit that the process can be performed using a catalytic dealkylation unit, in which case, the processing parameters will be selected to conform with standard catalytic dealkylation processes.

We claim:

1. A process for preparing cyclohexane from toluene which comprises:
   (a) contacting a mixture of toluene and hydrogen in a first reaction zone in the absence of a catalyst and under thermal dealkylation conditions effecting a conversion of toluene to benzene, the mole ratio of hydrogen to toluene being at least 2,
   (b) passing the total effluent of the first reaction zone directly to a second reaction zone,
   (c) introducing additional hydrogen into the second reaction zone providing a hydrogen to benzene mole ratio of at least 5, (d) contacting said total effluent of the first reaction zone and said hydrogen in the second reaction zone with a hydrogenation catalyst under hydrogenation conditions effecting a conversion of benzene in said total effluent to cyclohexane and a conversion of toluene in said total effluent to methylcyclohexane, (e) recovering methylcyclohexane from the second reaction zone, (f) contacting the methylcyclohexane from step (e) together with hydrogen in a third reaction zone in the presence of a dehydrogenation catalyst under dehydrogenation conditions effecting a conversion of methylcyclohexane to toluene, and (g) introducing the toluene from step (f) into the first reaction zone.

2. A process according to claim 1 wherein the hydrogen in the mixture of toluene and hydrogen and the hydrogen introduced into the second reaction zone originate from the same source and a major portion of the total hydrogen employed is recycled to said source following the conversion in the second reaction zone.

3. A process according to claim 1 in which the hydrogen to toluene mole ratio in the mixture of step (a) is between 2:1 and 12:1 and the temperature of reaction mixture in the first reaction zone is at least 1150° F.

4. A process according to claim 1 wherein the mole ratio of hydrogen to benzene in step (c) is between 5:1 and 15:1.

5. A process according to claim 4 wherein the mole ratio in step (c) is between 8:1 and 13:1 and the hydrogenation conditions of step (c) include a temperature between about 300 and 500° F. and a pressure between 300 and 800 p.s.i.g.

6. A process according to claim 1 where in steps (b) and (c) part of the total effluent of said first reaction zone is introduced into the second reaction zone with said hydrogen and the remaining portion of said first reaction zone effluent is introduced into said second reaction zone at a plurality of intermediate points of said second reaction zone.

References Cited
UNITED STATES PATENTS 3,400,167  9/1968  Heuke et al. _____ 260—666

DELBERT E. GANTZ, Primary Examiner

V. O. KEEFE, Assistant Examiner

U.S. Cl. X.R.

260—666